United States Patent
Weich et al.

(10) Patent No.: US 7,715,408 B2
(45) Date of Patent: May 11, 2010

(54) METHOD FOR ESTABLISHING COMMUNICATION PLANS FOR A DIVIDED REAL-TIME COMPUTER SYSTEM

(75) Inventors: Carsten Weich, Vienna (AT); Christian Tanzer, Vienna (AT); Gerhard Könighofer, Neunkirchen (AT); Martin Glück, Spannberg (AT)

(73) Assignee: TTTech Computertechnik AG, Vienna (AT)

( * ) Notice: Subject to any disclaimer, the term of this patent is extended or adjusted under 35 U.S.C. 154(b) by 274 days.

(21) Appl. No.: 11/717,359

(22) Filed: Mar. 13, 2007

(65) Prior Publication Data

US 2007/0206603 A1 Sep. 6, 2007

(30) Foreign Application Priority Data

Sep. 15, 2004 (AT) .............................. A 1554/2004
Sep. 7, 2005 (WO) ....................... PCT/AT05/00357

(51) Int. Cl.
*H04L 12/28* (2006.01)
(52) U.S. Cl. .................................... 370/395.4
(58) Field of Classification Search ................. None
See application file for complete search history.

(56) References Cited

U.S. PATENT DOCUMENTS

| | | | |
|---|---|---|---|
| 4,866,606 A | 9/1989 | Kopetz | |
| 5,694,542 A | 12/1997 | Kopetz | |
| 5,729,755 A * | 3/1998 | Turski | 710/305 |
| 5,887,143 A | 3/1999 | Saito et al. | |
| 6,894,991 B2 * | 5/2005 | Ayyagari et al. | 370/325 |
| 7,167,478 B2 * | 1/2007 | Visweswaraiah | 370/395.4 |
| 7,339,948 B2 * | 3/2008 | Balasubramanian et al. | 370/458 |
| 2002/0167960 A1 * | 11/2002 | Garcia-Luna-Aceves | 370/442 |
| 2004/0153682 A1 | 8/2004 | Fuehrer et al. | |

(Continued)

FOREIGN PATENT DOCUMENTS

EP 1355460 A 10/2003

(Continued)

OTHER PUBLICATIONS

International Search Report, PCT/AT05/000357, dated Jan. 23, 2006 (3 pages).

(Continued)

*Primary Examiner*—Chirag G Shah
*Assistant Examiner*—Amarnauth Persaud
(74) *Attorney, Agent, or Firm*—Anton P. Ness; Dennis M. Carleton; Fox Rothschild LLP

(57) ABSTRACT

A method for establishing communication schedules for a distributed real-time computer system comprising nodal computers, wherein: a) a grid (RAS) is created, which contains all of the parameters necessary to enable basic communication between nodes (KR1 ... KR5) of a cluster (CLU); b) nodal communication schedules (KPG; KP1, KP2) for all nodes planned to be used as invariant components (KR2; KR2, KR3) are derived from the grid (RAS) and all parameters of the grid are copied and node-specific parameters are added; and c) cluster communication schedules (CP1, CP2; CL1, CL2) are derived from the nodal communication schedules (KPG; KP1, KP2), which contain, in addition to all parameters of the grid and the node-specific parameters of the invariant components, those parameters which are relevant to the remaining nodes of the cluster.

11 Claims, 4 Drawing Sheets

U.S. PATENT DOCUMENTS

2004/0213264 A1* 10/2004 Mistry et al. .............. 370/395.7
2006/0248197 A1* 11/2006 Evans et al. ................. 709/227

FOREIGN PATENT DOCUMENTS

| WO | WO 01/13230 A1 | 2/2001 |
| WO | WO 02/099643 | 12/2002 |
| WO | WO 2004/023302 A2 | 3/2004 |

OTHER PUBLICATIONS

Written Opinion, PCT/AT05/000357, dated Jan. 23, 2006 (5 pages) *(2 pages translated) into 1 page).

*TTP:* "TTP/C—Fault-Tolerant Real-Time Communication with Integrated High-Level Services"; date unknown (11 pages).
*Robert Bosch GmbH:* Time-Triggered Communication CAN (Time Triggered CAN-TTCAN); Führer et al; date unknown (7 pages).
*OMI Conference Paper:* Time-Triggered Architecture (TTA); Scheidler et al; date unknown (9 pages).
*TATA ELXSI Limited:* "Flex Ray Communication Controller"; date unknown (4 pages).
*Flex Ray Consortium;* "Flex Ray Communication System Protocol Specification," Version 2.1, Revision A; December 22, 2005 (pp. 1, 2, 214-217).

* cited by examiner

METHOD FOR ESTABLISHING COMMUNICATION PLANS FOR A DIVIDED REAL-TIME COMPUTER SYSTEM

CROSS-REFERENCE TO RELATED APPLICATIONS

This application claims priority from PCT Application No. PCT/AT05/000357 filed Sep. 7, 2005, which in turn claims priority from Austrian Patent Application No. A 1554/2004 filed Sep. 15, 2004.

FIELD OF THE INVENTION

The invention relates to a method for establishing communication plans for a distributed real-time computer system comprising nodal computers.

BACKGROUND OF THE INVENTION

Communication schedules are necessary in order to define clear and unique time-triggered communication within a distributed, time-triggered real-time computer architecture, hereinafter referred to as a "cluster." Distributed, time-triggered real-time systems are used, inter alia, in automobiles or aircraft. Such systems are described, for example, in the following documents: U.S. Pat. Nos. 5,694,542; 4,866,606 and 5,887,143; European Patent No. 1,222,542 B1; and World Patent Publication Nos. WO 2002/099643 A3 and WO 2004/0233302.

Bus protocols for distributed, time-triggered real-time systems are further described in: TTP: "TTP/C Protocol Specification", available on http://www.tttech.com; FlexRay: "FlexRay Communication System Protocol Specification", available on http://www.flexray.com; and "TTCAN (time-triggered communication on CAN)", ISO 11898-1. Detailed information concerning communication schedules are also available in: Kopetz, H. (1997)—"Real-Time Systems, Design Principles for Distributed Embedded Applications", ISBN: 0-7923-9894-7, Boston, Kluwer Academic Publishers; and Kopetz, H., Bauer, G.—"The Time Triggered Architecture", *Proceedings of the IEEE* Vol. 91, No. 1, Jan. 2003, pp. 112-126.

The following short definitions are provided with reference to the terminology used.

"Communication schedule" Contains the sum of all parameters that are necessary for the unique determination of time-triggered communication. These consist of at least the following:
  Size of the slots, allocation of the transmitter nodes for all slots
  Number of the communication rounds
  Bit position and length of all individual messages within a slot
  Additional protocol-dependent parameters, such as, for example, the length of the waiting periods between slots "Cluster communication schedule" The parameters for this are complete and are thus available for all nodes in their entirety—unlike the node communication schedule.

"Node communication schedule" This refers to those parameter subsets of a communication schedule that are adequate to configure a node and make it capable of communication.

"Slot" A period of time in time-triggered communication, which is allocated uniquely to a specific node. Only this particular node may send messages within this time period.

"Cluster" An abbreviated term for a distributed, time-triggered real-time system consisting of nodes and the communication system via which the nodes can exchange messages in accordance with the communication schedules.

"Node" Integrated, electronic computer. A node communicates with other nodes in the same cluster via a time-triggered communication channel.

"Grid" This term is used in the context of the invention for a meta-communication schedule. It refers to the sum of the parameters that are necessary to establish compatibility between various communication schedules within the scope of the present invention.

"Invariant component" For the purposes of the invention, this term refers to a node that can be used unchanged in various clusters implementing the same software and the same nodal communication schedule.

"Cluster variant" A cluster variant is a variant of another cluster if the cluster variant and the original cluster have at least one common node type (invariant component).

If, for example, clusters are used in an automobile, then the individual nodes are associated with different individual applications, such as, for example, engine control, control of the air-conditioning system, control of seat adjustments, exhaust purification, etc. If an automobile is to be offered with different equipment and fittings, then it becomes necessary to use cluster variants, which, however, leads to variations in the communication schedules. Thus, the same nodal computers must have, in different variants, different communication schedules so that they do, in fact, differ from one another. This leads to undesirable complications and costs with the large-scale production of cluster variants, since it must either be possible to subsequently load the communication schedules into the nodal computers, or a node variant must be provided for each cluster variant. The process of loading the communication schedules must normally be done on the production bench and costs time and leads to logistic problems. The provision and storage of various node variants for each cluster variant naturally leads to costs in a similar manner.

It is therefore necessary to find means of using invariant components that can be applied without any modification to different cluster variants. In principle, nodal computers can also communicate when their communication schedules do not exactly reflect the specific cluster. Communication can work as long as all communication partners of the node transmit and receive messages in conformity with the schedules of the node.

BRIEF SUMMARY OF THE INVENTION

It is an object of the invention to provide a method for creating communication schedules that enable the use of invariant components. This object is achieved by a method as defined in claim 1, to wit:

a method for establishing communication schedules for a distributed real-time computer system comprising nodal computers, comprising the steps of:
  a) creating a grid which contains all of the parameters necessary to enable basic communication between nodes of a cluster, characterized in that:
  b) deriving nodal communication schedules for all nodes planned to be used as invariant components from said grid and all parameters of the grid are copied and node-specific parameters are added, and
  c) deriving cluster communication schedules from said nodal communication schedules, which contain, in addition to all parameters of the grid and the node-specific parameters of the invariant components, those parameters which are relevant to the remaining nodes of the cluster.

A special advantage of the method of the invention is that correct communication schedules can be created promptly and constructively without having to "test" them.

In order to make it possible to configure cluster variants using invariant components, it is currently necessary to create master communication schedules in which, with the help of deliberation and skillful distribution of slots and messages, it is assured that nodes can be used in multiple variants. This work, however, is prone to errors involving trial-and-error manipulation of parameters and it is not always certain that each combination really works. By contrast, the method of the invention guarantees the correct interaction of nodes in all cluster variants by setting up compatible communication schedules.

The method is simplified in many cases when the grid is extracted (copied) from a communication schedule that already exists.

The method of the invention is particularly reliable and time-saving when nodal communication schedules are created for two or more invariant components of the cluster. The same applies to one embodiment of the invention in which at least two variants of cluster communication schedules are created. It is particularly advantageous when communication schedules for clusters of nodal computers in automobiles are created, since cost reduction can be achieved thereby.

The invention further relates to a computer program with program code resources for executing all the steps when the program is run on a computer, a cluster communication schedule that has been created in accordance with one of the methods as described above, a cluster communication schedule that has been created with the help of a computer program of the type mentioned, a data medium that can be read by the computer and that contains a computer program of the type mentioned and also a data medium that contains a communication schedule that can be read by the computer and that has been created using a method of the invention.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
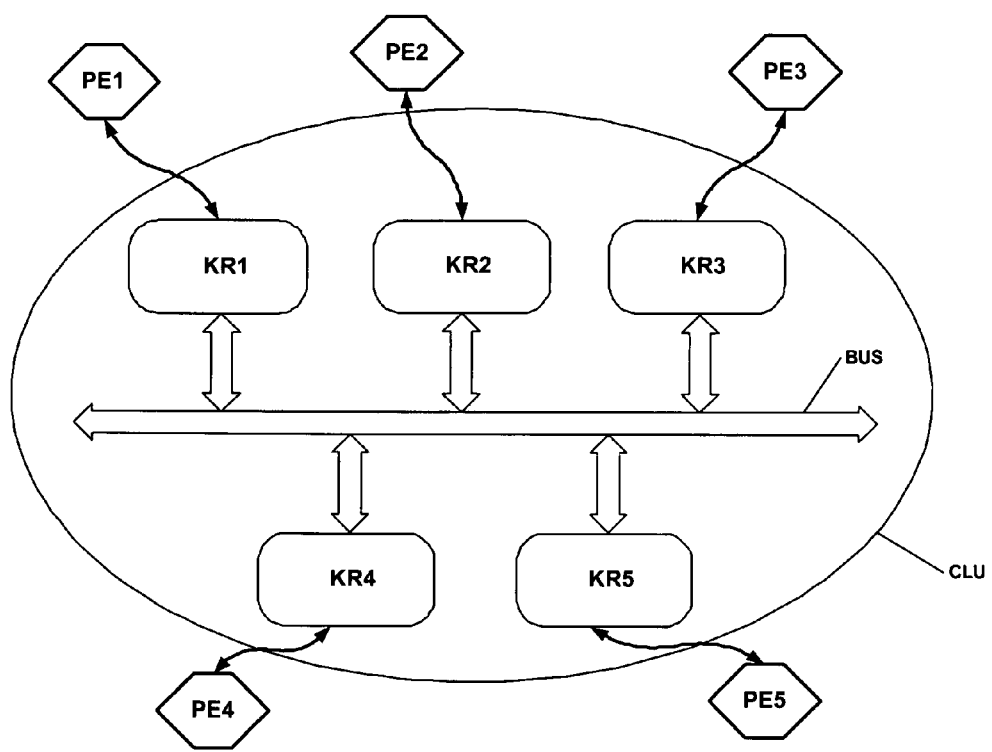
FIG. 1 is a diagrammatic representation of a cluster comprising five nodal computers.
Figure 2:
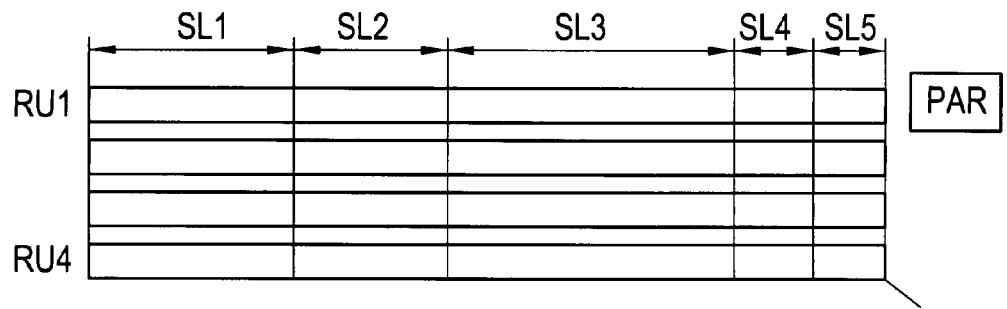
FIG. 2 is a simplified diagram of a grid consisting of four rounds for each of five slots.

In the drawings, like numerals indicate like elements throughout. Certain terminology is used herein for convenience only and is not to be taken as a limitation on the present invention. The term "cluster" refers to the nodal computers of a distributed real-time computer system, and is shown in FIG. 1. The terminology includes the words specifically mentioned immediately hereinabove and in the Background of The Invention, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

With reference to FIG. 1, there is first shown an example of a distributed real-time computer system comprising nodal computers, briefly referred to as a "cluster". The system contains, for example, five nodal computers KR1 . . . KR5 that can communicate with one another via a bus BUS. The nodal computers KR1 . . . KR5 in turn communicate with the peripheral devices PE1 . . . PE5. The distributed real-time computer system has been referenced as CLU in FIG. 1.

The nodal computer KR1 can be the controller of an air-conditioning system and the peripheral PE1 contain the air-conditioning system as such, e.g. an air-conditioning compressor, temperature sensors, humidity sensors, etc.

The nodal computer KR2 can, for example, be the door controller in an automobile and the peripheral PE2 could be components of the door, e.g. a switch in the door, a wing mirror, a power window motor, etc.

The nodal computer KR3 can be a seat controller in the car under consideration and the peripheral PE3 can include seat components e.g. a switch in the seat, adjustment motors, etc.

The nodal computer KR4 can be the air-conditioning valve controller and the peripheral PE4 could contain the ventilation valves, e.g. fan motors, valve adjustment means, etc.

The nodal computer KR5 and the associated peripheral PE5 are not considered here and may be regarded as a "reserve".

To remain with the example of automobiles, there are doors, seats, and air-conditioning systems in various designs. In luxury designs, for example, the doors communicate with the seat and the air-conditioning system, a memo function adjusts the wing mirror, the door and the seat and the desired inside temperature. These options are not available with the simpler variants of a model, although the air-conditioning controller will always communicate with the air-conditioning valve controller. Owing to the different variants, e.g. two types of door, three types of seat, two types of air-conditioning system and so on, there are innumerable combinations, and in the present example there are twelve variations. If each cluster variant were to be treated as a controller variant, then in this example it would be necessary to provide twelve door control device variants instead of merely two having different functions. Thus, the use of invariant components that can be used without any modification in various models of the relevant automobile is worthy of consideration.

FIGS. 2 to 5 illustrate the first example of a method according to the invention for creating communication schedules. To begin with, in the first step (FIG. 2) a grid RAS is created. Such a grid can either be developed from scratch or can be created from an existing communication schedule, so to speak, be "extracted" therefrom. Here, for example, the grid defines that the communication schedule contains five transmitters with transmission slot sizes SL1, SL2, SL3, SL4, and SL5. The grid also defines that the communication schedule consists of four rounds RU1 ... RU4. Moreover, other parameters (supplementary parameters) are also defined that are denoted in the form of a small box PAR. These parameters PAR include the transmission velocity, the physical transmission protocol (transmission medium, coding) and other parameters dependent on the respective transmission protocol, such as, for example, the waiting periods between slots and/or rounds.

Figure 3:
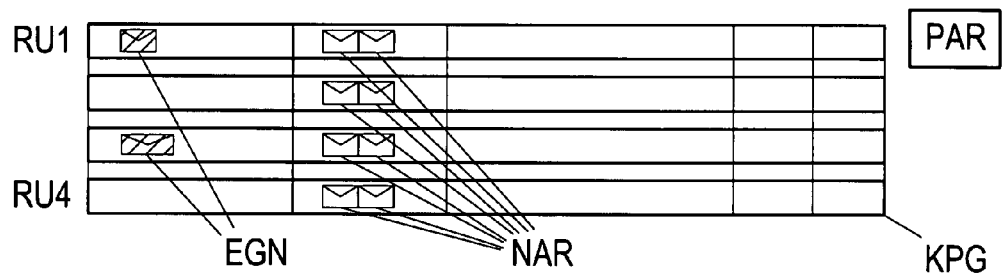
FIG. 3 shows the communication schedule of an invariant component derived from the grid illustrated in FIG. 1.

In the next step, the nodal communication schedule KPG for all nodes planned to be used as invariant components, the nodal computer KR2 in the present example, is derived from the grid RAS and, in the process, all parameters of the grid are accepted and node-specific parameters are added. FIG. 3 illustrates the basis of such a nodal communication schedule KPG that defines that the nodes transmit in a specific slot SL2, while the transmitted messages NAR are defined as regards their position relative to the cycle and/or the round and also with their bit position in the slot. The nodal communication schedule KPG also defines that the node expects specific incoming messages, namely two messages EGN in slot SL1 in the rounds RU1 and/or RU3 in the present case.

Figure 4:
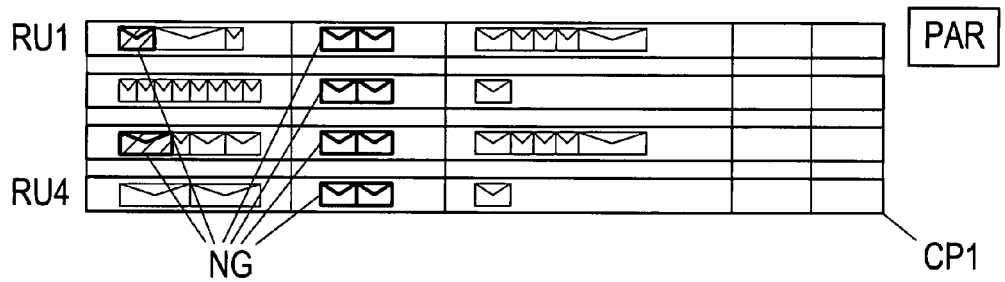
FIG. 4 presents a first variant of a cluster communication schedule in which the communication schedule of the invariant components shown in FIG. 2 has been integrated.
Figure 5:
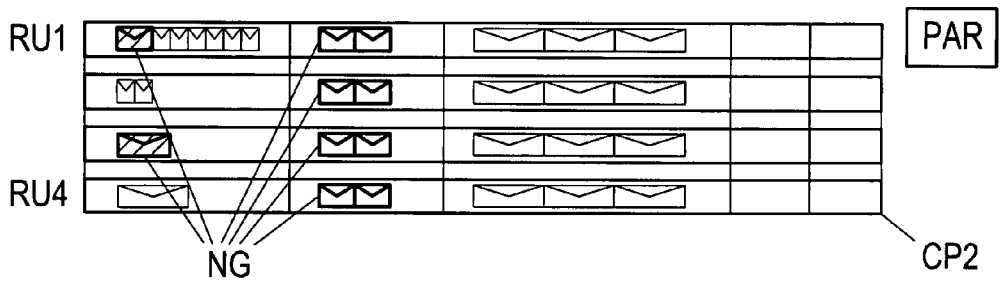
FIG. 5 shows another variant of a cluster communication schedule in which the communication schedule of the invariant component according to FIG. 2 likewise also been integrated.
Figure 6:
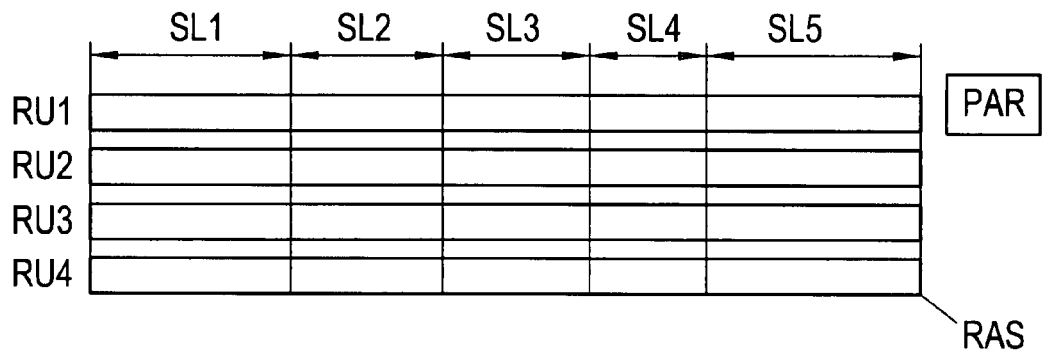
FIG. 6 is a diagram of a grid similar to that depicted in FIG. 2, but with a different slot distribution.
Figure 7:
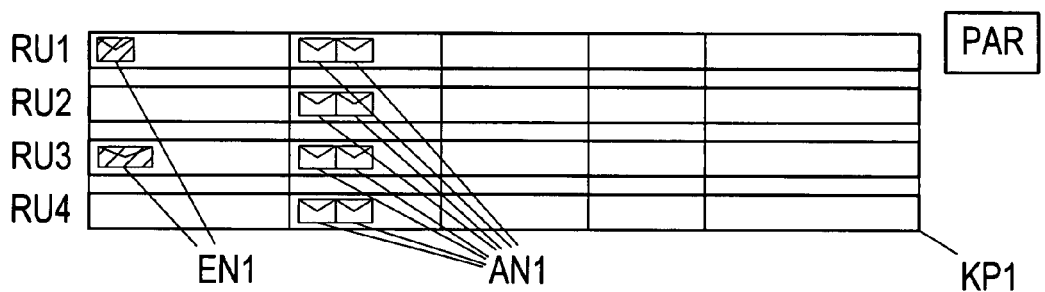
FIG. 7 illustrates a communication schedule derived from the grid of FIG. 6 for a first type of invariant component.
Figure 8:
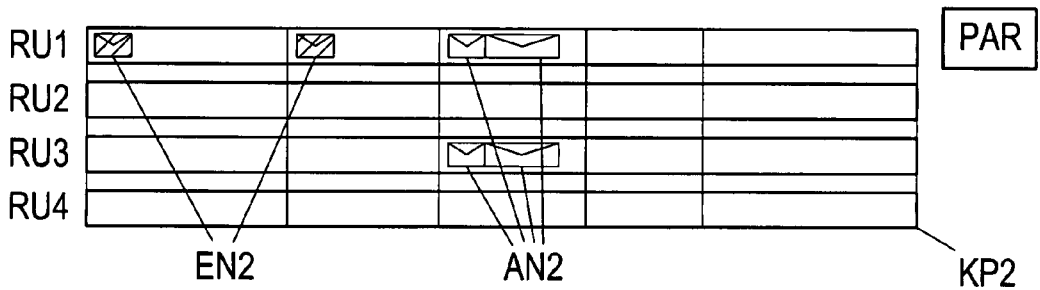
FIG. 8 depicts a communication schedule derived from the grid of FIG. 6 for a second type of invariant component.

A node with this nodal communication schedule KPG can now be used in different clusters that must each be derived from the same grid. FIGS. 4 and 5 illustrate two different cluster variants in which the node KR2 is used as an invariant component. Since the grid parameters are now the same both in the nodal communication schedule KPG and in the cluster communication schedule CP1 and CP2 respectively, the communication can, in principle, be started. The transfer of the nodal communication schedule KPG to the two communication schedules CP1, CP2 of the cluster variants also ensures that all messages that are required by the invariant component are also available at the right position in each variant.

FIGS. 2 to 5 depict the significant characteristics of the communication schedule wherein the additional parameters already mentioned are represented in FIGS. 3 to 5 in a general way as boxes and are referenced as PAR. Incoming and outgoing messages of the invariant component are designated by NG.

As far as the parameters of the grid RAS are concerned, they are a subset of the parameters of a cluster communication schedule CP1, CP2. These grid parameters include all parameters that are theoretically required to enable time-triggered communication between the nodes KR1 ... KR5 of the cluster as regards the reception of messages. These parameters include at least the following:

Parameters of the physical layer in accordance with the ISO/OSI layer model: The exact parameters, as already mentioned, depend on the protocol used and concern the transmission velocity, the bit transmission protocol used, the coding, etc.

Size of the slots: The length of the slots is dependent on the protocol used. For example, the slots in the TTP protocol have different lengths, but in the FlexRay protocol, however, the time-triggered slots are all of the same length.

Size of the segments, i.e., sections in the communication schedule, depending on the respective protocol and also on the required network idle times: In the TTP protocol there is the size of the inter frame gap (waiting period between slots), whilst in the FlexRay protocol it is the size of the static and dynamic segments and also the length of the symbol window and the network idle time that have to be considered. In the TT CAN protocol there is the position and length of the exclusive windows and also of the arbitrating windows.

Number of communication rounds.

Beyond this, depending on the actual time-triggered transmission protocol used and depending on the actual communication controller hardware, there will be other parameters necessary to enable basic communication. Such parameters will therefore also belong to the grid parameters RAS.

The grid parameters can be created or derived from existing cluster communication schedules with the aid of tools (utility or service programs), mixed forms being possible if desired. Thus, parameters of existing nodes can be used and broadened to develop cluster communication schedules, in which these nodes can then be used together with others.

A nodal communication schedule KPG that has been derived from a grid consists of the following parameters:

Pointer to a specific grid RAS: By means of this the nodal communication schedule KPG is regarded as being derived from the said grid and all parameters of the grid are implicitly transferred to the nodal communication schedule.

Determination of the transmission slots of the node.

Full definition of the messages transmitted, i.e., time of transmission, length, etc.

List of the incoming messages of the node: The incoming messages are to be defined respectively by the slot, their position relative to the cycle of the communication schedule (round) and by their bit position within the slot.

Nodal communication schedules, KPG in this case, that have been derived from the same grid, can be copied to the cluster communication schedule CP1, CP2. Here again, the transfer is supported by tools in order to ensure that there are no overlaps in the message positions or that the definition of the messages transmitted meets the overall requirements of the nodal communication schedules CP1, CP2 that have been copied. The cluster communication schedules CP1, CP2 created finally consist of the following parameters:

Pointer to a specific grid: By this means, the cluster communication plans CP1, CP2 are also regarded as having been derived from the grid and all parameters of the grid are implicitly copied to the cluster communication schedule.

Number of nodes: The number of nodes has a fixed value in this (end) phase of the generation of the communication schedules. Naturally, it will always be possible to broaden the communication schedule later if free slots are still available.

Allocating the slots to the transmitter nodes: Full definition of all messages sent in accordance with the parameters frequently mentioned above.

The diagrams given in FIGS. 6 to 10 are again based on a cluster as illustrated in FIG. 1, for the sake of simplicity, and the difference thereof from the schedules based on FIGS. 2 to 5 resides in the use of two invariant components instead of a single invariant component.

The nodal computer KR1, that is the controller of the air-conditioning system in the present example, occupies the slot SL1. In addition to effecting the air-conditioning control, the controller may be adapted to send a control message regarding the dimming of the switch lights, which is also read, inter alia, by the nodal computers KR2 and KR3 as messages EN1/2. In addition, the nodal computer may also be adapted to send a message regarding the outside temperature, which is received and processed as message EN1 by the door controller, i.e., the nodal computer KR2.

The nodal computer KR2, the door controller in the present example, occupies slot SL2, sends the message AN1 and receives the message EN1.

The nodal computer KR3, the seat controller in the present example, occupies slot SL3, sends the message ANL and receives the message EN2.

The communication schedule KP1 (FIG. 7) pertains to the nodal computer KR2, the door controller, and the communication schedule KP2 (FIG. 8) is associated with the nodal computer KR3, the seat controller; the two communication schedules KP1, KP2 both involve invariant components, whereas the nodal computer KR2 is associated with the first invariant component and the nodal computer KR3 is associated with the second invariant component.

Figure 9:
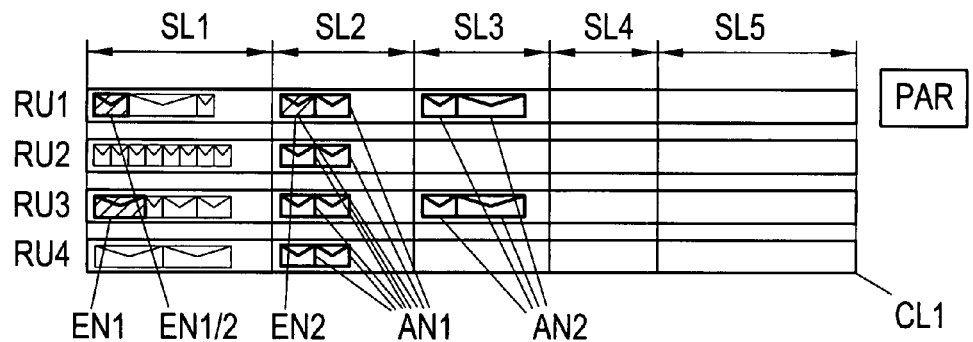
FIG. 9 presents a first variant of a cluster communication schedule in which the communication schedules of both types of invariant components according to FIGS. 7 and 8 are integrated.
Figure 10:
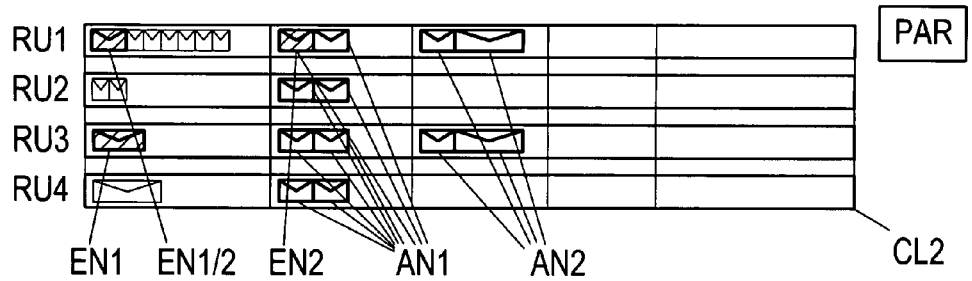
FIG. 10 contains a second variant of a cluster communication schedule in which both the communication plans of FIGS. 7 and 8 have been integrated in a similar manner.

FIGS. 9 and 10, in turn, illustrate two variants of cluster communication schedules CL1 and CL2 respectively, in which the various output messages in the slot SL1 relate to different damper/blower controllers. The messages transmitted by the damper controller KR4 and the "reserve node" KR5 are not shown in slot SL4 and SL5 respectively since only the received messages are relevant in this example.

The example thus illustrates that providing for different air-conditioning systems—even different communication on the bus—does not necessarily have to result in different seat and door controllers, i.e., the nodal computers KR2 and KR3 are designed as invariant components.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for establishing communication schedules for a distributed real-time computer cluster comprising nodal computers, comprising the steps of:
   a) creating a grid by a computer which contains parameters necessary to enable basic communication between nodes of a cluster;
   b) providing nodal communication schedules for all nodes planned to be used as invariant components, said nodal communication schedules having been derived based on the parameters contained in said grid and any node-specific parameters from said invariant components; and
   c) deriving cluster communication schedules from said nodal communication schedules which contain, in addition to all parameters of the grid and the node-specific parameters of the invariant components, those parameters which are relevant to the remaining nodes of the cluster;
   d) wherein said nodal communication schedules for said invariant components may be used in any grid having the same parameters.

2. A method as defined in claim 1, characterized in that said grid is extracted from an existing communication schedule.

3. The cluster of claim 2 wherein each of said nodes having an invariant nodal communication schedule has associated node-specific parameters, and further wherein said invariant nodal communication schedules are compatible with said cluster-wide parameters and said node-specific parameters.

4. A method as defined in claim 1, characterized in that node communication schedules are created for two or more types of invariant components of the cluster.

5. A method as defined in claim 1, characterized in that at least two variants of cluster communication schedules are created.

6. A method as defined in claim 1, characterized in that communication schedules are created for clusters of nodal computers in automobiles.

7. A cluster communication schedule created by a method as defined in claim 1.

8. A data medium able to be read by a computer and containing a communication schedule as defined in claim 7.

9. A data medium able to be read by a computer and containing a computer program for carrying out the method as defined in claim 1.

10. The cluster of claim 1 wherein said grid contains all cluster-wide parameters necessary to enable communications between said plurality of node in said cluster.

11. A distributed computing cluster comprising:
   a plurality of computing nodes in communication with each other;
   a grid, defining a plurality of slots, said slots defining the timing and length and of transmission windows for said cluster during which said computing nodes may transmit messages, said grid containing parameters necessary to enable basic communication between said nodes in said cluster;
   a plurality of invariant nodal communication schedules associated with specific respective computing nodes, said nodal communication schedules having been derived based on the parameters contained in said grid and any node-specific parameters from said invariant components, wherein each of said nodes having an invariant nodal communication schedule is assigned to a slot in said grid;
   a cluster communications schedule containing all grid parameters, all node-specific parameters, and any other parameters relevant to other nodes in said cluster, said cluster communication schedule being derived from said plurality of invariant nodal communications schedules;
   wherein each of said nodes having an invariant nodal communication schedule may transmit messages to other of said computing nodes during it's assigned slot and may receive messages during any defined slot, and further wherein said invariant nodal communications schedules may be used in any grid having the same parameters.

* * * * *